United States Patent
Panahandeh et al.

(10) Patent No.: US 11,378,411 B2
(45) Date of Patent: *Jul. 5, 2022

(54) METHOD AND SYSTEM FOR UTILIZING A TRIP HISTORY TO PREDICT A DESTINATION

(71) Applicant: VOLVO CAR CORPORATION, Gothenburg (SE)

(72) Inventors: Ghazaleh Panahandeh, Gothenburg (SE); Nasser Mohammadiha, Gothenburg (SE); Joakim Lin Sorstedt, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/736,090

(22) Filed: Jan. 7, 2020

(65) Prior Publication Data

US 2020/0149914 A1 May 14, 2020

Related U.S. Application Data

(63) Continuation of application No. 15/441,689, filed on Feb. 24, 2017, now Pat. No. 10,578,451.

(30) Foreign Application Priority Data

Mar. 4, 2016 (EP) .................................... 16158691

(51) Int. Cl.
*G01C 21/36* (2006.01)
*G01C 21/34* (2006.01)

(52) U.S. Cl.
CPC ..... *G01C 21/3617* (2013.01); *G01C 21/3484* (2013.01)

(58) Field of Classification Search
CPC ............ G01C 21/3617; G01C 21/3484; G01C 21/3492; G01C 21/3691; G01C 21/12;
(Continued)

(56) References Cited

U.S. PATENT DOCUMENTS 6,317,686 B1 * 11/2001 Ran .................... G01C 21/3691
701/117
7,419,095 B2 * 9/2008 Yoshioka ............... G06Q 10/10
235/384

(Continued)

FOREIGN PATENT DOCUMENTS

DE 102006057920 A1 6/2008
EP 1551195 A1 10/2003
(Continued)

OTHER PUBLICATIONS

Extended European Search Report for EP 16158691.2, completed by the European Patent Office dated Oct. 21, 2016, All together 8 Pages.
(Continued)

*Primary Examiner* — Richard A Goldman
(74) *Attorney, Agent, or Firm* — Brooks Kushman P.C.

(57) ABSTRACT

A method for utilizing a trip history of a vehicle during a trip from an original position to a destination includes: (a) determining the original position; (b) comparing the original position to a mapping database covering the trip; (c) determining a road segment of the mapping database associated to the original position; (d) determining a current position during the trip; (e) comparing the current position to the mapping database; (f) determining a road segment of the mapping database associated to the current position; (g) setting the road segment as a link of the trip; (h) repeating (e)-(g) until the destination is reached; (i) determining the destination; (j) comparing the destination to the mapping database; (k) determining a road segment of the mapping
(Continued)

database associated to the destination; and (l) representing the trip as connected links between the original position and destination, each link corresponding to a road segment.

15 Claims, 7 Drawing Sheets

(58) Field of Classification Search
CPC ............. G01C 21/14; G08G 1/096827; G08G 1/0129; G08G 1/09626; H04W 4/028
USPC .................................. 701/461, 424, 414, 521
See application file for complete search history.

(56) References Cited

U.S. PATENT DOCUMENTS

| | | | |
|---|---|---|---|
| 7,487,918 B2 | 2/2009 | Kudo et al. | |
| 7,536,258 B2* | 5/2009 | Kudo | G01C 21/3617 340/995.19 |
| 7,630,828 B2* | 12/2009 | Tajima | G01C 21/3617 340/995.1 |
| 7,788,208 B2* | 8/2010 | Kobayashi | G06Q 30/00 706/52 |
| 8,068,977 B2* | 11/2011 | Ozawa | G01C 21/00 701/465 |
| 8,271,497 B2* | 9/2012 | Ikenoue | G06F 16/29 707/740 |
| 8,533,726 B2* | 9/2013 | Nishihara | B60W 40/02 718/104 |
| 8,538,677 B2* | 9/2013 | Gutman | G01C 21/00 701/400 |
| 8,577,599 B2* | 11/2013 | Johnson | G01C 21/3492 701/411 |
| 8,660,794 B2* | 2/2014 | Currie | G01C 21/34 701/532 |
| 8,754,777 B1* | 6/2014 | Mendis | G01C 21/3484 340/636.1 |
| 8,768,616 B2* | 7/2014 | Kristinsson | G01C 21/3617 701/467 |
| 8,831,879 B2* | 9/2014 | Stamm | H04W 4/029 701/465 |
| 8,892,350 B2* | 11/2014 | Weir | G06K 9/00664 701/400 |
| 9,163,952 B2* | 10/2015 | Viola | G01C 21/362 |
| 9,219,668 B2* | 12/2015 | Johnson | H04W 4/029 |
| 9,288,629 B2* | 3/2016 | Huang | H04W 64/006 |
| 9,392,074 B2* | 7/2016 | Aggarwal | H04L 67/306 |
| 9,396,654 B2* | 7/2016 | Yoshioka | G08G 1/0962 |
| 9,398,113 B2* | 7/2016 | Aggarwal | G06F 16/9537 |
| 9,476,727 B2* | 10/2016 | Ziezold | G06N 5/04 |
| 9,618,343 B2* | 4/2017 | Kahn | G01C 21/3617 |
| 9,803,990 B2* | 10/2017 | Fletcher | G01C 21/3484 |
| 10,388,085 B2* | 8/2019 | Harish | G01C 21/3461 |
| 2002/0161517 A1* | 10/2002 | Yano | G01C 21/3617 701/420 |
| 2004/0260457 A1* | 12/2004 | Kawase | G08G 1/005 701/410 |
| 2005/0071078 A1* | 3/2005 | Yamada | G08G 1/096716 701/410 |
| 2005/0125148 A1* | 6/2005 | Van Buer | G01C 21/3617 701/468 |
| 2005/0228553 A1* | 10/2005 | Tryon | B60W 10/26 701/22 |
| 2005/0251325 A1* | 11/2005 | Kudo | G08G 1/096811 235/472.01 |
| 2005/0267680 A1* | 12/2005 | Watanabe | G01C 21/367 701/454 |
| 2010/0010733 A1 | 1/2010 | Krumm | |
| 2010/0145608 A1* | 6/2010 | Kurtti | G01C 21/3484 701/533 |
| 2011/0238289 A1* | 9/2011 | Lehmann | G01C 21/3617 701/533 |
| 2013/0179070 A1 | 1/2013 | Kristinsson et al. | |
| 2013/0046456 A1* | 2/2013 | Scofield | G01C 21/3423 701/117 |
| 2015/0134244 A1 | 5/2015 | Hershey et al. | |
| 2015/0339575 A1* | 11/2015 | Streit | G06F 16/9535 706/48 |
| 2017/0017928 A1* | 1/2017 | Miller | G06Q 10/1095 |
| 2017/0303110 A1* | 10/2017 | Truong | G05D 1/0212 |

FOREIGN PATENT DOCUMENTS

| | | |
|---|---|---|
| EP | 2080984 A1 | 7/2009 |
| EP | 2369299 A1 | 3/2011 |

OTHER PUBLICATIONS

European Patent Office, Communication Pursuant to Article 94(3) EPC for European Patent Application No. 16158691.2-1001, dated Jun. 15, 2021.

* cited by examiner

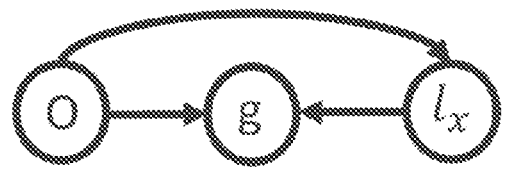
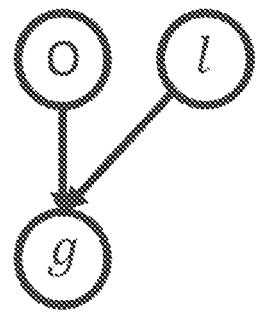
Fig. 3a    Fig. 3b
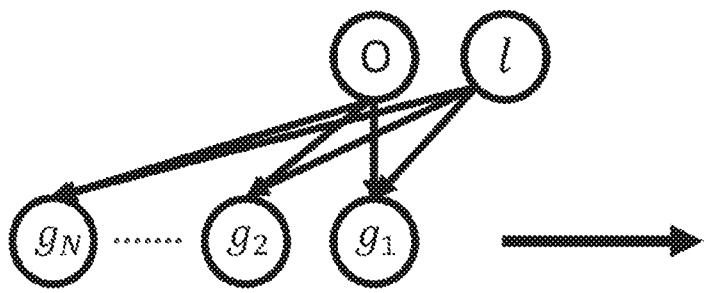
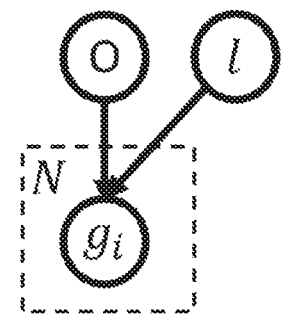
Fig. 3c
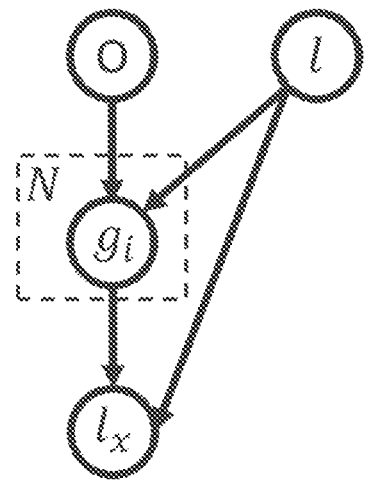
Fig. 4

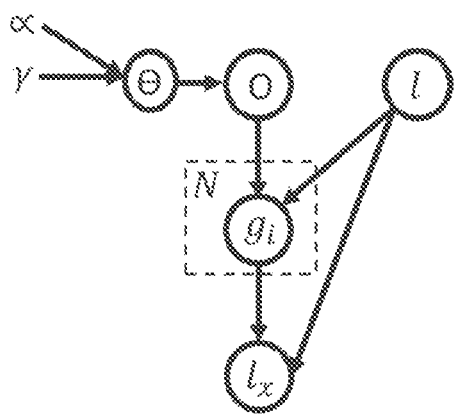
```
destination daytype roundedtime
         3       0        1518
         4       1         610
         4       1         610
        12       1        1518
         3       0        1015
         4       1         610
         3       0        1015
         4       1         610
```
Fig. 5        Fig. 7
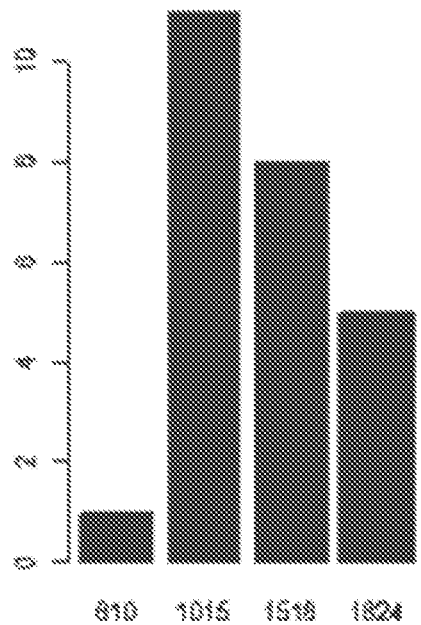
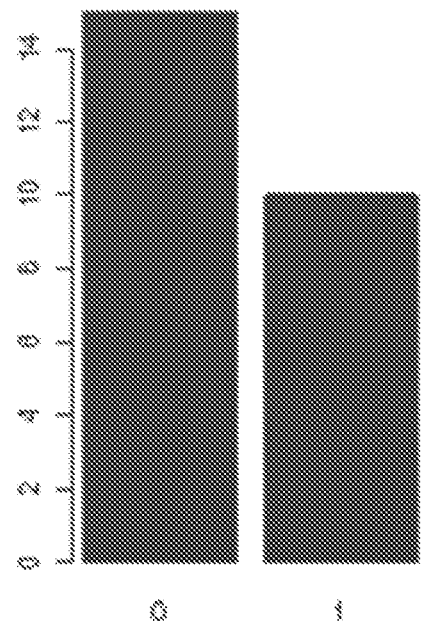
Fig. 6a        Fig. 6b

```
 2    3    4  6  9 12 13    14 17 18 19 21 22 27 36 40
 0 1.00 0.0  0  0  0  0  0.00  0  0  0  0  0  0  0  0
 0 0.00 1.0  0  0  0  0  0.00  0  0  0  0  0  0  0  0
 0 0.00 1.0  0  0  0  0  0.00  0  0  0  0  0  0  0  0
 0 0.55 0.4  0  0  0  0  0.05  0  0  0  0  0  0  0  0
 0 1.00 0.0  0  0  0  0  0.00  0  0  0  0  0  0  0  0
 0 0.00 1.0  0  0  0  0  0.00  0  0  0  0  0  0  0  0
 0 1.00 0.0  0  0  0  0  0.00  0  0  0  0  0  0  0  0
 0 0.00 1.0  0  0  0  0  0.00  0  0  0  0  0  0  0  0
```

Hash function

| Hash Key |
|---|
| Origin 1 |
| Origin 2 |
| ... |
| Origin j |

| Destination | Duration (min) | Day | Start Time | Number of Passenger |
|---|---|---|---|---|
| Destination 1 | 34 | Mon | 8 | 1 |
| Destination 1 | 28 | Tue | 8:05 | 1 |
| Destination 5 | 85 | Sat | 11:20 | 4 |
| Destination 3 | 15 | Sat | 18:40 | 4 |
| Destination 1 | 40 | Mon | 7:55 | 1 |
| ... | ... | ... | ... | ... |

| Destination | Duration (min) | Day | Start Time | Number of Passenger |
|---|---|---|---|---|
| Destination 3 | 34 | Mon | 17 | 2 |
| Destination 3 | 28 | Tue | 17:05 | 2 |
| Destination 3 | 85 | Wed | 16:20 | 2 |
| Destination 3 | 15 | Thur | 16:40 | 2 |
| Destination 1 | 40 | Fri | 16:55 | 2 |
| ... | ... | ... | ... | ... |

Table 1

Fig. 10

Hash function

| Hash Key |
|---|
| Link 1 |
| Link 2 |
| ... |
| Link n |

Hash value corresponding to hash key (Link 1)

| Connected link | Destination | Counter |
|---|---|---|
| Link 2 | Destination 1 | 3 |
| Link 5 | Destination 1 | 10 |
| Link 5 | Destination 7 | 8 |
| ... | ... | ... |
| Link m | Destination j | k |

Hash value corresponding to hash key (Link n)

| Connected link | Destination | Counter |
|---|---|---|
| Link k | Destination 1 | 7 |

Hash value corresponding to hash key (Link 2)

| Connected link | Destination | Counter |
|---|---|---|
| Link 3 | Destination 1 | 3 |

Table 2

Fig. 11

METHOD AND SYSTEM FOR UTILIZING A TRIP HISTORY TO PREDICT A DESTINATION

CROSS-REFERENCE TO RELATED APPLICATIONS

This application is a continuation of U.S. application Ser. No. 15/441,689 filed Feb. 24, 2017, now U.S. Pat. No. 10,578,451, which claims foreign priority benefits under 35 U.S.C. § 119(a)-(d) to European patent application number EP 16158691.2, filed Mar. 4, 2016, both of which are incorporated by reference herein in their entireties.

TECHNICAL FIELD

The present disclosure relates to a method for utilizing a trip history, which method is performed by a system being comprised in a navigation device on-board a vehicle during a trip from an original position to a destination. The disclosure further relates to a system for utilizing a trip history, a destination prediction system and a vehicle comprising the system.

BACKGROUND

Nowadays, huge amounts of location-based data are being shared through the cellular networks with GPS receivers in car navigation systems. The availability of such data opens up new research areas in pattern analysis and data mining. Analyzing individual driving/mobility-patterns from logged GPS data have found a wide range of applications, such as path or destination prediction, real time traffic volume estimation, city planning, energy consumption optimization, etc. In these systems, predictive models are constructed mainly based on statistical properties of data given that it follows some regularity patterns. The patterns can be inferred by analyzing driving history, including routes from origins to destinations.

The current driving route and destination prediction methods are using the history of driving GPS data which can also be connected with additional metadata, e.g. describing characteristics of trip such as driver-id, number of passengers, time-of-say, day-of-week.

However, existing methods may have some drawbacks. Sometimes, statistical properties of data are ignored. That is, the absolute value of predefined observations is used for prediction. Hence, there will be no prediction if the current observation does not totally match the history. In addition, conditions for each person and also between different individuals are weighted equally, which poses another problem. For example, let's consider both time-of-day and day-of-week as two conditions used in the prediction. Both of the conditions could be useful in predicting destinations which are visited based on regular patterns, such as work; however, for many other destinations, e.g. grocery store, it is hard to find such a regularity both in time and day. Hence, the predictability of the model will be reduced if the prior information is not modelled properly and the conditions are equally weighted for all destinations. Additional issue with the existing methods is that they are not flexible in adding or removing features or prior information. And to adapt it with new features, the algorithm should be re-trained again for all recorded data.

SUMMARY

The object of the present disclosure is to overcome or ameliorate at least one of the disadvantages of the prior art, or to provide a useful alternative.

The object above may be achieved by the subject-matter of claim 1. Embodiments are set forth in the appended dependent claims, in the following description and in the drawings.

Thus, according to the disclosure there is provided a method for utilizing a trip history. The method is performed by a system comprised in a navigation device on-board an vehicle during a trip from an original position to a destination. The method comprises the steps of a) determining by means of a positioning determining unit the original position of the navigation device, b) comparing the original position to a mapping database covering at least the trip, c) determining a road segment of the mapping database associated to the determined original position, d) determining by means of the positioning determining unit a current position of the navigation device during the trip, e) comparing the current position to the mapping database covering at least the trip, f) determining a road segment of the mapping database associated to the determined current position, g) setting the determined road segment as a link of the trip, h) repeating steps e)-g) until the destination is reached, i) determining by means of the positioning determining unit the destination, j) comparing the destination to the mapping database, k) determining a road segment of the mapping database associated to the determined destination, l) representing the trip as a series of connected links between the original position and the destination, each link corresponding to a road segment of the mapping database.

The method for utilizing a trip history as disclosed herein describes a method suitable for data collection to be used for destination prediction in a vehicle. The method may be performed by a system, e.g. the system for utilizing a trip history as disclosed herein, which is comprised in a navigation device. The navigation device may be comprised in the vehicle. Alternatively, or as a complement, the navigation device may be a separate mobile device, which can be placed and used in the vehicle.

The original position, also called the origin, defines where the trip starts. It may be a parking lot, e.g. outside a home of the user of the vehicle, a place of work, a school, a shop, a mall, a sport facility or an entertainment facility.

The destination defines where the trip ends. Correspondingly to the original position, it may be a parking lot, e.g. outside a home of the user of the vehicle, a place of work, a school, a shop, a shopping mall, a sport facility or an entertainment facility.

A trip is supposed to be ended, when the vehicle has been standing still for a preselected time, e.g. 5 minutes. This may be decided by means of the positioning determining unit. As an alternative, or a complement, a trip may be supposed to be ended when the ignition of the vehicle is turned off.

The positioning determining unit may use a satellite positioning system, such as GPS, i.e. Global Positioning System.

The mapping database comprises information about roads at least in an area, in which the trip is taking place. The mapping database may also comprise additional information about possible destinations, such as residential areas, places of work, schools, shops, shopping malls, sports facilities and/or entertainment facilities. The mapping database may cover a city, a county or a country. A plurality of mapping databases may be combined with each other. The information of the database may be stored on a computer-readable medium to be used in the vehicle, or the information of the mapping database may be stored in a central location and transmitted to the navigation device.

However, with the method as disclosed herein, the mapping database is mainly used as source for a road graph map, and thus the additional information mentioned above may be dispensed with. The method may thus be carried out, although there is no available information about the physical meaning of a place. The road graph map may be utilized to provide information about the density of the road graphs, which can help to understand the density of that location. The concept of density is then used for the destination clustering. That means that the destinations, which are nearby, may be grouped together and the closeness measure may be related to the density of the road graph. Purely as an example, for an area, which has low density, it may be assumed that at that place there is a possibility to park at larger distance from a specific destination. This is further explained in the article "Clustering Driving Destinations Using a Modified DBSCAN Algorithm with Locally Defined Map-Based Thresholds", G. Panahandeh and N. Akerblom, in Proc. of Computational Multi Physics, Multi Scales and Multi Big Data in Transport Modeling, Simulation and Optimization (CM3), 2015.

In steps c, f and k the mapping database, e.g. the road graph map, is used to determine a road segment, which fits with the determined position. The road segment is associated to the determined position. If the fit is not exact, the closest road segment may be selected.

When the trip is ongoing, a current position is determined, which is compared to the mapping database and a road segment is associated to the determined current position. Thereafter the road segment is set as a link of the trip.

A road comprises one or more road segments, following after each other along the road. The road segment may e.g. extend between two intersections of the road being used as nodes. See the below description of nodes for further examples. However, also a road or a portion of a road having no intersections may be divided into road segments. The division may depend on the structure of the mapping database and may e.g. relate to an interspace given in meters. A link as utilized in the method described herein corresponds to a road segment. The link may further comprise information about the running direction for vehicles on that road segment.

As mentioned above, the road segments are used as links, such that the link corresponds to a road segment. The links may be represented in a road graph representation of the route used during the trip. This may be done by using a model, in which each unit of the road graph representation is represented with a link between two nodes. The position of the nodes is taken from the mapping database. The link may extend between two intersections of a road system or between an intersection and a possible original position or destination, such as a house in a residential area, a place of work, a school, a shop, a shopping mall, a sport facility or an entertainment facility.

Nodes can represent: roads intersecting at the same vertical level; a change in an attribute information in the mapping database, e.g. a name change of the road, a bridge or a tunnel; an intersection with a cartographic feature, such as an administrative border or park; the geographic perimeter of a database; and the end of a link.

How detailed the node is defined may depend on the resolution of mapping database. Moreover, different mapping databases may use different nodes.

As used herein the term intersection comprises any road-crossing or branching-off, wherein it is possible to select between two or more alternative roads. The intersection may be two roads crossing, i.e. intersecting, at about 90 degrees. However, the angle may also be different from 90 degrees, such as e.g. a highway exit, a Y-crossing or a T-crossing.

Two or more determined positions may be associated to the same road segment or link, if no node has been passed, since the last link was determined.

When the trip continues, one current position is determined after the other, forming a series of determined positions and thereby also a series of connected links.

Once the destination is reached, the trip is represented as the series of connected links, which links were passed during the trip. As mentioned above, the series of links may be represented as a road graph representation.

The method as described herein may also be performed for at least one other trip having another original position, another destination and/or utilizing other roads.

When going between two defined positions, there may sometimes be alternative routes. For example, going from the same original position to the same destination, may be regarded as another trip, if an alternative route was taken.

The method as described herein may be performed for at least one trip being performed at another trip characteristic than a first trip, e.g. regarding time of day, day of week, time duration of trip, season, number of passengers, fuel level and/or battery level. In this case, the route may be the same as being used before, but at least one trip characteristic may have been changed.

The method may comprise storing trip data, e.g. in a hash table, as data sets. The storing step may be performed stepwise in parallel to any one of the steps a-1 mentioned above, i.e. when making the trip, or it may be performed after step 1, i.e. when the trip is finished.

A data set of the trip data may comprise information of the original position, the destination and the series of connected links between the original position and/or the destination. The method as described herein is then used for collecting trip data.

A hash table structure is a data structure suitable for an associative array implementation. The hash table supports insertion, deletion, and search in average-case constant time which provides an efficient way of mapping and accessing data. Its data structure is similar to a table structure in which each entry has a key. In the method as described herein, it makes sense to use a hash table with the links as hash keys, where the hash values are the connected links and destinations. Furthermore, it makes sense to use a hash table with origins as key and destinations from each origin as hash values.

The data set of the trip data may also comprise information about a number of times a certain trip has been performed. Thereby frequently used routes will have a higher number.

The trip data may also comprise information about a trip characteristic, e.g. regarding time of day, day of week, time duration of trip, season, number of passengers, fuel level and/or battery level. In other words, trip characteristics are parameters describing characteristics of a trip, also referred to as prior information. Data of one or more trip characteristics may be stored. In the method as described herein, the trip characteristics may be stored in a hash table with origins as key and destinations from each origin as hash values, the trip characteristics being stored along with destinations as hash values.

Preferably, it is possible to add a new trip characteristic also after data collection has started. Data having been collected before the new trip characteristic was added may then be associated with a default value for the added new trip characteristic.

Once data has been collected, the stored trip data may be used for destination prediction. The method may then comprise associating a probability for a next link and a destination given a current link, wherein the probability is based on the stored trip data. The predicted destination is selected from destinations of the stored trip data.

Statistical models, such as probabilistic Bayesian models, may be employed to analyse stored trip data. Moreover, a probabilistic model of prior information, i.e. trip characteristics, may be used in the Bayesian framework. In other words, probabilistic models, such as Bayesian modls, in which statistical properties of prior information are considered in the prediction, may be employed. Taking into account the statistical properties of prior information in the destination prediction improves the performance of the prediction.

The method may comprise updating the probability during a trip, for which trip the destination is predicted. For example, assume an intersection, from which there are at least two different roads leading to at least two different possible destination, and one of the two roads is selected by the user of the vehicle, then the probability for a destination, which is reached by the non-selected road, may be set to zero, and the probabilities for the remaining possible destinations may be updated accordingly.

When an ongoing trip is associated with at least one hitherto unobserved trip characteristic, e.g. regarding time of day, day of week, time duration of trip, season, number of passengers, fuel level and/or battery level, existing data sets of the stored trip data may be utilized by applying weight factors. Thereby, stored data sets having trip characteristics being close to the hitherto unobserved trip characteristic may have a greater weight than stored data sets having trip characteristics being far from the hitherto unobserved trip characteristic.

Purely as an example: Assume a user usually going from home to work at 8.00 o'clock every week day, goes home in the afternoon and then goes from home to a shopping mall at about 17.00 on Mondays and Thursday. Then, if the user on a week day leaves home at 8.30, which is a hitherto unobserved time of the day, the work may be given a high weight, while the shopping mall may be given a low weight.

The method may comprise storing trip data associated to an individual user. The user is normally the same person as the driver. However, it would also be possible that the vehicle is a partially automated, semi-automated or fully automated vehicle, in which case the user may not be driving the vehicle. In a partially automated vehicle or a semi-automated vehicle, a driver of the vehicle performs some of the driving functions, while the vehicle autonomously performs other functions. If the vehicle is fully automated, the vehicle autonomously performs the driving functions, at least for a temporary period of time. A vehicle may be arranged to be able to change between driving manually, partially automated, semi-automated and/or fully automated.

The stored trip data may also comprise at least one operation parameter of the vehicle, such as velocity, orientation, gas pedal opening rate, brake pressure, steering angle.

The method may comprise the possibility to remove at least one of the data sets of the stored trip data if irrelevant. Purely as an example, data may become irrelevant if the user e.g. moves to a new home, changes place of work or school and/or switches to a new shop thereby no longer buying in the old shop. The irrelevant trip data may be gradually phased out, e.g. if it is observed that a specific trip is no longer being performed. The relevancy may be determined by determining the periodicity of driving to that destination.

According to the disclosure there is also provided a system for utilizing a trip history, the trip going from an original position to a destination. The system comprises: a positioning determining unit for determining a position passed during the trip, a unit for comparing the determined position to a mapping database covering at least the trip and for determining a road segment of the mapping database associated to the determined position and for setting the determined road segment as a link of the trip,—a storage unit for storing trip data, e.g. in a hash table, as data sets, a data set of the trip data at least comprising information of original position, destination and/or a series of connected links between the original position and the destination.

The system for utilizing a trip history is adapted to perform the method as described herein.

The system may be comprised in a destination prediction system, which also comprises a unit for predicting the destination based on the stored trip data.

According to the disclosure there is also provided a vehicle comprising the system for utilizing a trip history as disclosed herein and/or the destination prediction system.

BRIEF DESCRIPTION OF THE DRAWINGS

The present disclosure will hereinafter be further explained by means of non-limiting examples with reference to the appended drawings wherein:

FIG. 3a shows the Bayesian graphical model of equation (2);

FIG. 3b shows a graph representation of destination probability;

FIG. 3c shows a graph representation of destination probability for multiple destinations;

FIG. 4 shows a graph representation of next link probability;

FIG. 5 shows a graphical representation of the proposed Bayesian model with multiple priors;

FIGS. 6a-b show the histogram of two attributes, time-of-day distribution and weekdays distribution, of destination 3 for data represented in Table 1;

FIG. 7 shows a test dataset;

FIG. 10 shows a hash table with origins as key and destinations from each origin as hash values; and FIG. 11 shows a hash table in which links are selected as keys and their corresponding next links and destinations as hash value.

It should be noted that the appended drawings are not necessarily drawn to scale and that the dimensions of some features of the present disclosure may have been exaggerated for the sake of clarity.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1A:
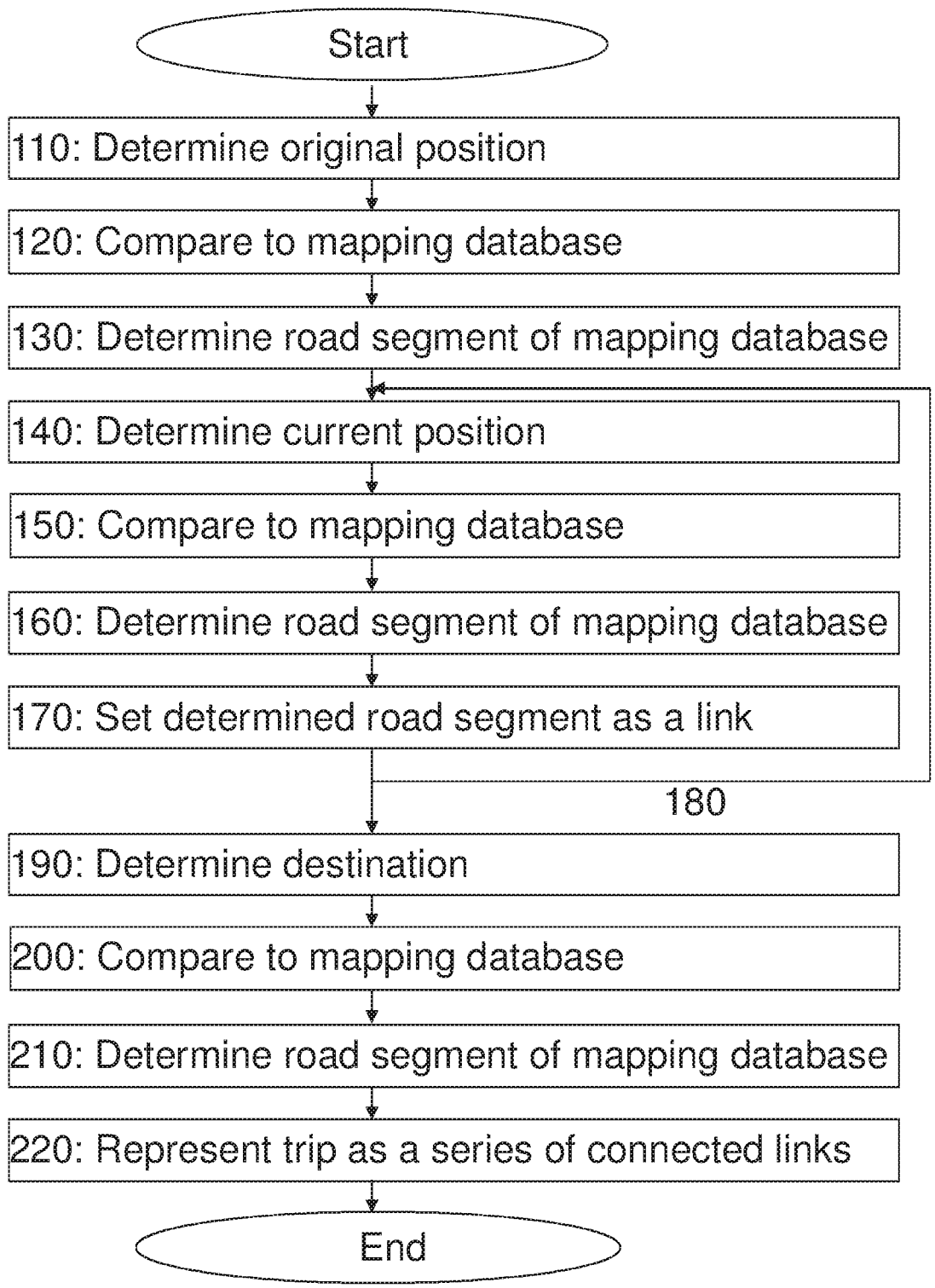
FIGS. 1a-c illustrate methods for utilizing a trip history according to the disclosure.

FIG. 1a illustrates a method according to the disclosure. The method comprises the steps of 110: determining by means of a positioning determining unit the original position of the navigation device, 120: comparing the original position to a mapping database covering at least the trip, 130: determining a road of the mapping database associated to the determined original position, 140: determining by means of the positioning determining unit a current position of the navigation device during the trip, 150: comparing the current position to the mapping database, 160: determining a road of the mapping database associated to the determined current position, 170: setting a road segment of the determined road as a link of the trip, 180: repeating steps 140-170 until the destination is reached, 190: determining by means of the positioning determining unit the destination, 200: comparing the destination to the mapping database, 210: determining a road of the mapping database associated to the determined destination, 220: representing the trip as a series of connected links between the original position and the destination, each link corresponding to a road of the mapping database.

The method may be performed by a system 500 for utilizing a trip history as described in conjunction with FIG. 2 below, which system is comprised in a navigation device. The navigation device may be comprised in the vehicle. Alternatively, or as a complement, the navigation device may be a separate mobile device, which can be placed and used in the vehicle.

Figure 1B:
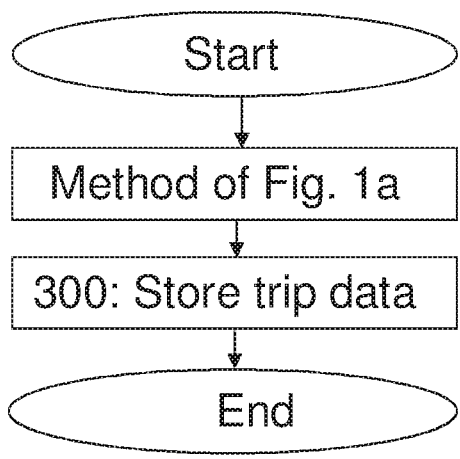

FIG. 1b illustrates another method according to the disclosure. The method of FIG. 1b includes the steps of FIG. 1a. It further comprises a step 300 of storing trip data, e.g. in a hash table, as data sets. The storing step 300 may be performed stepwise in parallel to any one of the steps 110-220 mentioned above, i.e. when making the trip, or it may be performed after step 220 of FIG. 1a, as is illustrated in FIG. 1b, i.e. when the trip is finished.

A data set of the trip data may comprise information of the original position, the destination and the series of connected links between the original position and/or the destination. The method as described herein is then used for collecting trip data.

The data set of the trip data may also comprise information about a number of times a certain trip has been performed. Thereby frequently used routes will have a higher number.

The trip data may also comprise information about a trip characteristic, e.g. regarding time of day, day of week, time duration of trip, season, number of passengers, fuel level and/or battery level. One or more trip characteristics may be stored.

Preferably, it is possible to add a new trip characteristic also after data collection has started. Data, having been collected before the new trip characteristic was added, may then be associated with a default value for the added new trip characteristic.

Figure 1C:
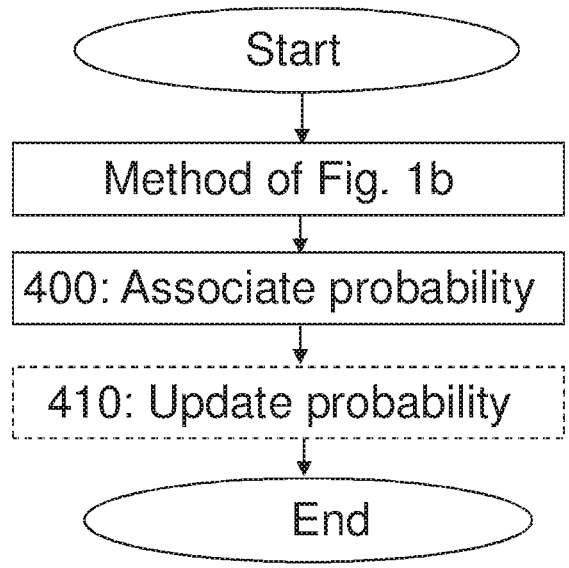

FIG. 1c illustrates yet another method according to the disclosure. The method of FIG. 1c includes the steps of FIG. 1b. It further comprises a step 400 of associating a probability for a next link and a destination given a current link, wherein the probability is based on the stored trip data. Once data has been collected, the stored trip data may be used for destination prediction. The predicted destination is selected from destinations of the stored trip data.

The method may, as an option, comprise a step 410 of updating the probability during a trip, for which trip the destination is predicted. For example, assume an intersection, from which there are at least two different roads leading to at least two different possible destination, and one of the two roads is selected by the user of the vehicle, then the probability for a destination, which is reached by the non-selected road, may be set to zero, and the probabilities for the remaining possible destinations may be updated accordingly.

Figure 2:
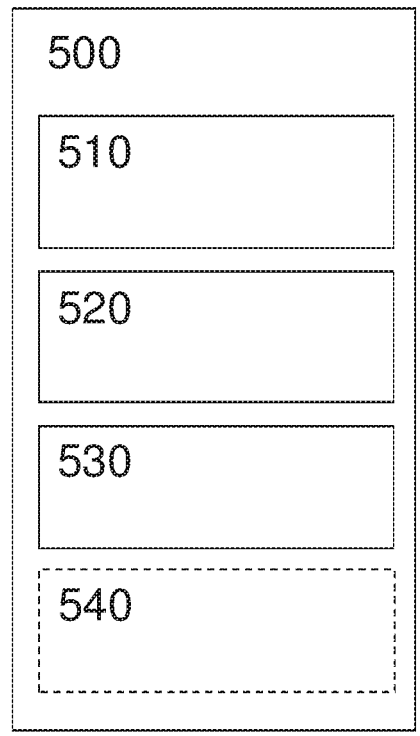
FIG. 2 is a schematic illustration of a system for utilizing a trip history according to the disclosure.

FIG. 2 schematically illustrates a system 500 for utilizing a trip history, the trip going from an original position to a destination. The system 500 comprises—a positioning determining unit 510 for determining a position passed during the trip,—a unit 520 for comparing the determined position to a mapping database covering at least the trip and for determining a road segment of the mapping database associated to the determined position and for setting the determined road segment as a link of the trip,—a storage unit 530 for storing trip data, e.g. in a hash table, as data sets, a data set of the trip data at least comprising information of original position, destination and/or a series of connected links between the original position and the destination.

The system 500 for utilizing a trip history is adapted to perform the method as described herein.

The system may be comprised in a destination prediction system, which also comprises a unit 540 for predicting the destination based on the stored trip data.

Those skilled in the art will appreciate that the system 500, position determining unit 510, comparing unit 520, storage unit 530, predicting unit 540, and/or any other unit, system, device or module described herein may comprise, in whole or in part, a combination of analog and digital circuits and/or one or more processors configured with appropriate software and/or firmware, e.g. stored in a memory, that when executed by the one or more processors perform the functions and/or operations described herein. One or more of such processors, as well as the other digital hardware, may be included in a single ASIC (Application-Specific Integrated Circuitry), or several processors and various digital hardware may be distributed among several separate components, whether individually packaged or assembled into a SoC (System-on-a-Chip). Furthermore, the system 500, position determining unit 510, comparing unit 520, storage unit 530, predicting unit 540, and/or any other unit, system, device or module described herein may for instance be implemented in one or several arbitrary nodes comprised in the vehicle. In that regard, such a node may comprise an electronic control unit (ECU) or any suitable electronic device, which may be a main or central node

EXAMPLE

In the following example an embodiment of the disclosure disclosed herein is described. The example illustrates a way of performing the method for utilizing a trip history according to the disclosure. The example further describes a prediction method, as is also disclosed herein, and a system for utilizing a trip history and for estimating a driver's intended route and destination.

1 Background

In this example, a practical prediction method and system for estimating driver's intended route and destination is described. Probabilistic Bayesian models are employed to analyse history of driving for individuals in this example. Furthermore, data attributes are GPS traces captured during trips. The proposed probabilistic model is built up in the road graph level which is associated with its corresponding destination/origin and additional data describing characteristics of each trip. Moreover, a new clustering algorithm to group stationary GPS traces, collected prior end of trips, into destination clusters, is proposed. By clustering destinations, overfitting the predictive model for multiple destinations corresponding to same physical location is avoided. The proposed clustering method captures well diversity of GPS coordinates in parking lots that can vary substantially between narrow and wide depending on characteristic of each destination. Low computational complexity, flexibility, and simplicity of the proposed algorithms that can be adapted and trained with time series data are the main advantages of the both predictive and clustering methods in this example.

2 Introduction

Shortly summarized, existing methods do not fulfil the following requirements of having a flexible prediction method: 1) handling missing data and using statistical models for the prior information rather than directly using the observations 2) adjusting the weights for different conditions to improve the model predictability 3) being adaptable for sequentially increasing data.

Despite large similarities in trajectories when driving from an origin to a destination, diversity of parking locations can vary depending on vicinity of parking lots for different destinations. Therefore, grouping end-of-trip locations is a primary step for driving data analysis, especially when constructing destination-dependent probabilistic models. In this example, it is proposed a method to cluster GPS data corresponding to driving destinations, the resulted clusters associated with trajectories are then used to enhance the prediction process. To the best of our knowledge, there are no records of looking into simultaneous destination clustering and prediction.

The focus of this example is to develop a practical route and destination prediction method by utilizing history of logged GPS data for individual drivers. Data analysis and model training are performed on GPS traces captured sequentially over time and additional data describing trip characteristics. For each trip, first the end location is detected, then it will be either added to one of the existing destination clusters or generate a new cluster. For this trip, the road-mapped GPS traces and other metadata are analyzed to update the training model which is used to predict the most probable route and destinations at each segment of the route during driving.

The key contributions of this example are summarized in the following:

Short range route and destination prediction by analyzing history of driving for individuals. A Bayesian model is constructed which uses history of GPS trajectories and additional parameters describing characteristics of each trip, referred as prior information. The model is flexible in having different prior information such as origin, driver id, number of passengers, time-of-day, day-of-week, and so on. In contrast to the existing methods in which the statistical properties of prior information are ignored, a probabilistic approach to take into account prior information in the Bayesian framework is proposed.

The proposed solution can be adapted to use the sequentially increasing data and can handle missing data, in contrary to machine learning algorithms using batch data, to learn the model parameters from the available dataset.

To characterize the parking lot diversities at each destination, a new clustering algorithm which is adapted according to the density of the street grid around each parking location is proposed. Thereby capturing inherent differences between driver destinations in disparate areas, e.g. urban, residential or commercial zones. This way, data distribution for each destination is concentrated which results in less computational time and less memory consumption when predicting and storing data.

3 System Model

The data attributes are GPS signals collected from portable GPS receivers installed in the car. To abstract away working with noisy GPS data, the road graph representation of the mapping database is used for the analysis. For this, GPS data are matched to the mapping database, which results in road graph representations of the routes. In this model each unit of the road graph is represented with a link between two nodes. To enhance from the node level to link, the two node-ids are assigned in the direction of travel to each link. For example, a physical link (in a two-way) street between node a and b is represented with ab or ba depending on direction of travel.

Herein, origin is denoted by o and destination by g. A trip is defined with sequence of links, 1, which are identified with unique ids. Each trip starts with ignition on event at a GPS location corresponding to origin-cluster, o, and ends with ignition off event at a GPS location corresponding to destination cluster, g.

The purpose of the analysis is to predict intended route and destination for individual drivers. The prediction is based on analyzing history of driving. Given the nature of the problem and the properties of the dataset, Bayesian statistics are used for data modelling and analysis. The basic concept of Bayesian statistics is the Bayes' theorem, $P(a|b)P(a)=P(b|a)P(a)$ for two variables. This can be extended for marginal distribution of three parameters, as $$P(a,b|c)=P(a|b,c)P(b|c). \quad (1)$$

Following (1), the conditional probability of next link $l_x$ and destination g given the current link l is represented as $$P(l_x,g|l)=P(l_x|g,l)P(g|l). \quad (2)$$

Herein, probabilistic graphical models are used to demonstrate dependency in structure between random variables. The simplicity in visualizing probabilistic models offers a powerful tool to represent dependencies and conditional independence in complicated models. In a probabilistic graphical model each node represents a random variable, and edges between the nodes (links) represent probabilistic dependencies among corresponding random variables. FIG. 3a shows the Bayesian graphical model of equation (2). In the compact representation N repeated nodes are replaced with a single node in a plate, in which the number of nodes is indicated inside the plate, see FIG. 3c.

4 Route and Destination Prediction

The basic of the proposed approach is Markov model and follows first order Markov chain process. The prediction problem is defined as follows: given the history of driving (GPS trajectories from origins to destinations) and the current location of car, what is the next probable route and destination? That is, the state prediction is done for the destination g and next link $l_x$ in the road graph and the observations are the current link 1 and additional metadata describing trip characteristic. Thereby only observations at the origin are considered, which observations can include for instance the location of origin, number of passengers in the car, or time of travel. For the sake of representation in this section, these types of prior information are represented by o. Given the preceding clarifications, the problem can be rephrased as a solution for $P(g|l,o)$ and $P(l_x|l,o)$. As mentioned before, in existing solutions either the prior information is totally ignored or history of data is recorded for each pair of $<l,o>$. Therefore, the link observations are restricted to the origin. In this case, increasing parameters in prior without having sufficient observation, which can support the current observation, will decrease the predictability of the model. In this example, a Bayesian model is introduced, in which statistical properties of priors are considered in the prediction.

4.1 $P(g|l,o)$

In the probabilistic model, it is assumed that the current link and origin are independent given the final destination (i.e., $P(l,o|g)=P(l|g)P(o|g)$). This makes sense in reality, since the choice of driving to the current route is mainly affected by the choice of destination, this will additionally avoid zero probability when a link to a destination is not observed from current origin, e.g., choice of driver in selecting alternative routes to a destination that were not taken before. This way, it is possible to count on the probability of driving to an observed destination from an origin when driving in a link which was not in the collection of $<l,o> \Rightarrow g$ but it has been in the collection of $l \Rightarrow g$. Based on this assumption and from the Bayes theorem, the transition probability to a destination given the origin and the current link can be written as $$\text{given that } P(l, o | g) = P(l | g)P(o | g) \Rightarrow P(g | l, o) = \frac{P(l, o | g)P(g)}{P(l, o)} \quad (3)$$

$$\text{multiplying by } \frac{P(g)}{P(g)} \Rightarrow$$

$$\text{from the Bayes theory} = \frac{P(l | g)P(o | g)P(g)}{P(l, o)}$$

$$= \frac{P(l | g)P(g)P(o | g)P(g)}{P(l, o)P(g)}$$

$$= \frac{P(g | l)P(l)P(g | o)P(o)}{P(l, o)P(g)}$$

$$= \frac{P(l)P(o)}{P(l, o)} \frac{P(g | l)P(g | o)}{P(g)}$$

$$\propto \frac{P(g | l)P(g | o)}{P(g)}.$$

The equality in (3) holds under using a normalization factor. Assuming a uniform distribution for destination, $$g \in \{g_1, g_2, \ldots, g_N\} \Rightarrow P(g_i) = \frac{1}{N},$$

equation 3 can be written as $$P(g | l, o) = \frac{\frac{P(g | l)P(g | o)}{P(g)}}{\sum_i \frac{P(g_i | l)P(g_i | o)}{P(g_i)}} \quad (4)$$

$$= \frac{P(g_i)}{P(g)} \frac{P(g | l)P(g | o)}{\sum_i P(g_i | l)P(g_i | o)}$$

$$= \frac{P(g | l)P(g | o)}{\sum_i P(g_i | l)P(g_i | o)}.$$

The proposed graphical model for destination prediction is given in FIG. 3b and FIG. 3c.

4.1 $P(l_x|l,o)$

The transition probability to the next link is not only a function of history of driving but also it depends on destination. To impose the transition probability of destinations to the possible connected link, the probability of transition to the next link over the destinations is marginalized. That is, the probability of transition to the next link $l_x$, given the origin o and the current link l is written as $$P(l_x | l, o) = \sum_i P(l_x, g_i | l, o) \quad (5)$$

$$= \sum_i P(l_x | g_i, l, o)P(g_i | l, o),$$

which is marginalized for all the destinations from link l followed by $l_x$. $P(g_i|l,o)$ is the transition probability to destination $g_i$ given the origin and the current link, calculated according to 4. Considering the graphical representation of this model in FIG. 4 (between the origin, destination, current link, and next link) equation (5) is rewritten as $$P(l_x | l, o) = \sum_i P(l_x | g_i, l)P(g_i | l, o), \quad (6)$$

that is, if $g_i$ is known, o does not add any information to $l_x$ and can be omitted.

To leverage from other statistical properties of data at origin, a separate model which is being updated for each origin-destination pair together with corresponding meta data, e.g., driver id, time-of-day, day-of-week, number of passengers, and etc. is used; see Section 5 for details.

4.3 Data Storage

For data storage, a hash table structure is used that is a data structure suitable for an associative array implementation. The hash table supports insertion, deletion, and search in average-case constant time which provides an efficient way of mapping and accessing data. Its data structure is similar to table structure in which each entry has a key. In this implementation data attributes are sequence of links to a destination, hence, it makes sense to use links as hash keys where the hash values are the connected links and destinations. Given the probabilistic model illustrated in FIG. 4, the two following tables are proposed:

A hash table with origins as key and destinations from each origin as hash values, Table 1, is shown in FIG. 10. Additional statistical properties can also be stored along with destinations.

A hash table in which links are selected as keys and their corresponding next links and destinations as hash value, Table 2, is shown in FIG. 11.

The hash values are stored in table format which let the values to be updated and fields to be added. Each variable in a table can have a different data type and size with the one restriction that each variable have the same number of rows. Given the proposed two hash table, all data historic required for predictions are efficiently summarized in the tables.

5 Prior Probability

The proposed prediction model in Section 3 uses only the prior information regarding origin. However, other prior information is also available at the time of travel which can be used to enhance the prediction performance. The proposed prediction model is the basic model when considering only origin as prior. In this case, it is possible to calculate the probability of traveling to each destination from the given origin by dividing number of times the destination is visited to the total number of destinations from that origin. The problem becomes more complicated when other data attributes are considered in the origin. For instance, calculating the probability of going to each destination given the current time and number of passengers.

An alternative solution of using additional factors in predicting driver route and destination uses an algorithm in which the conditions were deterministically imposed into the problem (classical method). That is for each detected condition, the data was stored separately; and for prediction only data which was matched with the current condition would be used. However, the results are not necessarily better when including additional factors when the model is deterministic. In this case, not all the stored data are informative and the variable importance (the contribution of each variable to the model) is calculated based on the density of data for each condition. To leverage from external information describing trip characteristics, a new model which take into account the probabilistic model of this information is proposed in this example. That is a statistical model is built up indicating the probability of current condition being in previously observed conditions. For that, different clustering methods were evaluated, such as SVM (support vector machine), bagging, random trees, and random forest. Given the characteristics of the data in this example and advantages of random forest, it was decided to choose random forest as the clustering candidate [1].

In data mining the idea is all about automating the process of searching for patterns in the data. To find out which pattern is of interest for this example, which data attribute that has the highest information gain for this example has to be found. Random forests provide a measure of predictor relative importance by measuring the damage that would be done to predictive models with no access to true values of a given variable. In the dataset of this example, there are different attributes which can have significant influences when predicting the destination, such as time of departure, day of week, driver, number of passenger, fuel level, and so on. The proposed clustering solution is not dependent in number of parameters and is generalized for arbitrary factors. The Bayesian graphical representation of this predictive model is illustrated in FIG. 5.

Figures 8, 9A:
FIG. 8 shows the probability matrix for the test data in FIG. 7.
FIGS. 9a-c show a comparison between DBSCAN and ML-DBSCAN for a sample dataset. (a) DBSCAN, $\varepsilon=100$ m. (b) DBSCAN, $\varepsilon=200$ m. (c) ML-DBSCAN.

To better understand the concept of random forest, the following examples may be considered. Table 3 reports destinations driven from home, for a single driver during 6 months with 300 trips. For destination 3 (the second most visited location), the histogram of two attributes (time-of-day and day-of-week) are plotted in FIG. 6a and FIG. 6b. In FIG. 6a, trip started between 6 and 10 is denoted by 610, between 10 and 15 with 1015, between 15 and 18 with 1518, and between 18 and 24 with 1824. In FIG. 6b, weekend is denoted by 0 and working days by 1. The random forest classifier was applied to this dataset when having both time-of-day and weekday as destination attributes. The resulted variable importance is reported in Table 4. For the dataset illustrated in FIG. 7, the estimated probability matrix using the random forest is depicted in FIG. 8. As it can be noticed all the destinations are correctly predicted except 12. As it can be seen in the training data, this destination is only travelled three times where there are not any patterns detected in the time and day attributes (their corresponding variable importance is zero). Then the reported variables in probability matrix are used as a prior (P(g|o)) in (4).

TABLE 3

| Destination | 2 | 3 | 4 | 6 | 9 | 12 | 13 | 14 | 17 | 19 | 21 | 22 | 27 | 36 | 40 |
|---|---|---|---|---|---|---|---|---|---|---|---|---|---|---|---|
| Number of visit | 1 | 25 | 65 | 1 | 14 | 3 | 2 | 1 | 1 | 1 | 1 | 2 | 1 | 1 | 1 |

TABLE 4

| Destination | 2 | 3 | 4 | 6 | 9 | 12 | 13 | 14 | 17 | 19 | 21 | 22 | 27 | 36 | 40 |
|---|---|---|---|---|---|---|---|---|---|---|---|---|---|---|---|
| Day type | 0 | 4.556091 | 2.935091 | 0 | 0 | 0 | −1.878673 | 0 | 0 | 0 | 0 | 0 | 0 | 0 | 0 |
| Time of Day | 0 | 4.138849 | 5.659560 | 0 | −1.025978 | 0 | 0 | 0 | 0 | 0 | 0 | 0 | 0 | 0 | 0 |

6 Origin/Destination Clustering

In this section, a method to cluster GPS data corresponding to driving destinations is proposed. A new DBSCAN-based algorithm is proposed to group stationary GPS traces, collected prior to end of trips, into destination clusters. DBSCAN is an abbreviation for density-based spatial clustering of applications with noise. While the original DBSCAN clustering algorithm uses a global threshold as a closeness measure in data space, a method to set local thresholds values for data points is developed in this example. The GPS data proximity strongly depends on the density of the street grid around each point. Specifically, the spread of GPS coordinates in parking lots can vary substantially between narrow (personal parking lot) and wide (parking lot of a shopping mall) depending on the destinations. To characterize the parking lot diversities at each destination, the concept of using a local threshold value for each data point is introduced. The local threshold values are inferred from road graph density using a mapping database. Moreover, a mutual reach ability constraint to preserve the insensitivity of DBSCAN with respect to the ordering of the points is proposed. The performance of the proposed clustering algorithm has been evaluated extensively using trips of actual cars in Sweden, and some of the results are presented here.

6.1 Proposed Clustering Algorithm

For the clustering application in this example, data attributes are geographical information corresponding to stationary GPS traces collected prior to end-of-trip. A trip starts from an ignition-on event at a location corresponding to an origin cluster and ends by an ignition-off event at a location corresponding to a destination cluster. Assuming connectivity properties for each pair of origin-destination, hereafter the term destination is used when referring to both the origin and the destination.

A cluster is a group of data that share a set of similar properties. In the application of this example, data attributes are numeric (GPS locations) where the similarity between two data object can be judged based on a distance measure. Moreover, in this problem, the number of clusters is not known in advance and data points are sequentially increasing over time. Given these requirements and the data type properties, a choice to use DBSCAN-based clustering algorithms was made because of their ability in discovering clusters with arbitrary shapes and processing large databases efficiently. The original DBSCAN [2] algorithm and its variations (OPTICS [3], LDBSCAN [4], PDBSCAN [5]) have been widely used for clustering spatial data. In these algorithms, the similarity measures are either defined globally in data space or determined locally based on density of data at different regions. In the application of this example, finding appropriate threshold value as a closeness measure can be very challenging depending on the location of the parking lot, which is independent of density of previously collected data at each region. Therefore, the current density-based algorithms do not provide a complete solution in our application considering the region-based clusters specifications.

Here, a modified DBSCAN clustering approach in which the local similarity measures are adapted according to the density of the road grid around each data point is proposed. Hence, the defined local similarities are independent of points density at each cluster. In the following, the original DBSCAN algorithm [2] is briefly described and then the proposed algorithm is presented.

In DBSCAN, clusters are formed by all points that are density-reachable from each other, i.e. connected through an unbroken chain of directly density-reachable points. In turn, a point p is directly density-reachable from a point q, if q has a minimum number of points (defined as minPts) including p within a distance threshold of ε. The minPts and ε values are given as global parameters into DBSCAN. The set of all points that are directly density-reachable from q is called the ε—neighborhood of q. All points which are not density-reachable from any other point are classified as noise.

Figure 9B:

FIG. 9a and FIG. 9b show the results of DBSCAN clustering in a subset of GPS coordinates for one user centered in the town of Alingsås (vicinity of 5 km²). The minPts value was set to 3 for both of these examples. To depict the deficiency of DBSCAN with respect to the clustering application of this example, two distinct ε values were chosen for each experiment. FIG. 9a illustrates the resulting clusters with ε=100 m, where noises (depicted in black) and six distinct dense clusters (depicted as enclosed by circles respectively) can be seen. The destination clusters correspond well to the self-identified activities of the user, except in the lower right corner, where two parking lots belonging to the same building are clustered as separate destinations. In an effort to correct that misclassification, the ε parameter is increased to 200 m, see FIG. 9b. This results in merging the lower right clusters correctly, while it also has the side effect of clustering many of the noise points (corresponding to distinct destination) in town as one large cluster. As can be observed, resulting destinations are highly dependent on properties of parking lots areas (density of the street grid around these point), which cannot be captured using only one global ε value.

To adapt the ε value in DBSCAN according to density of the street grid around each GPS location, a two-step solution is proposed. The first step is to modify the DBSCAN algorithm by defining an individual density threshold for each data point. The second step is to identify those thresholds using knowledge of the problem domain. To preserve symmetricity of the original DBSCAN algorithm when defining the individual density threshold for each data point, it is required to redefine the notion of ε-neighborhood from DBSCAN according to $N_\varepsilon(p)=\{q \in D | dist(p,q)<\varepsilon_p, dist(p,q)<\varepsilon_q\}$. That is p and q should be reachable from both directions to be considered members of the same neighborhood. It is worth mentioning that the run time efficiency of the DBSCAN is retained by performing the region query with $\varepsilon_p$ and subsequently excluding results that do not fulfil the condition $dist(p,q)<\varepsilon_q$.

Figure 9C:

As has been previously stated, in densely-built areas, e.g. in town and city centres, the result of a high ε value could be that the entire area is clustered together, while the opposite applies for low values of ε in less dense areas, i.e., they should be clustered together. This observation implies that there is an inverse relationship between the density of the area in which a point p is situated and the density threshold $\varepsilon_p$. As a density mea-sure, a mapping database is used to retrieve the number of road links within a constant radius of each point in the dataset. These density values are then used in a linear interpolation between a lower ε-bound for dense areas and an upper ε-bound for less dense areas. The ε-bounds and their corresponding (two)-breakpoints for the density values are set intuitively according to the data. The density values below and above the breakpoints are set to the lower and upper ε-bounds respectively, resulting in the application of the original DBSCAN algorithm on those points. FIG. 9c shows resulting clusters when applying the proposed algorithm of this example, referred to as the map-based local DBSCAN (ML-DBSCAN), to the same dataset. As can be seen, the previous issues with low and high ε values in FIG. 9a and FIG. 9b are resolved. For this implementation, the first and second break-points are set to 100 and 200, respectively, using the radius of 500 m, and the lower and upper bounds are set to 100 m and 200 m, respectively.

The performance of the proposed clustering algorithm has been extensively evaluated. Herein, some of the results are reported for five car users with 514, 366, 847, 599, and 754 detected parking events recorded during 4, 6, 6, 6, and 6 months, respectively. Table 3 shows the clustering results for three different radius settings, where interpolation parameters, including first and second breakpoints (1-BP, 2-BP), and upper and lower bounds are intuitively set to the given values. The experiments show that similar clustering results are obtained for all three radius values. These results were also visually confirmed on the map for individual users. To further study the sensitivity of the proposed algorithm to the parameter settings, the interpolation parameters (first and second breakpoints, and upper and lower bounds) were swept 10% around the values given in Table 5 at each radius, resulting to 81 different settings. The experiments show that the proposed algorithm leads to stable and visually-meaningful results for a wide range of parameter values, and no major change in the clustering results were observed.

TABLE 5

| | | | | | Number of clusters | | | | |
|---|---|---|---|---|---|---|---|---|---|
| Radius | 1-BP | 2-BP | Upper bound | Lower bound | user 1 | user 2 | user 3 | user 4 | user 5 |
| 750 | 150 | 300 | 200 | 100 | 31 | 22 | 18 | 27 | 30 |
| 500 | 100 | 200 | 200 | 100 | 31 | 21 | 17 | 27 | 31 |
| 250 | 50 | 100 | 200 | 100 | 31 | 21 | 17 | 27 | 30 |

7 Results

The results show that over 99% of the time the prediction given the origin as prior outperforms the basic predictive model without prior.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A destination prediction system comprising a prediction unit for predicting a destination for a vehicle, the prediction unit being configured to obtain information of a current location of the vehicle and associating the current location with a current link in stored trip data comprising information of origin cluster, destination cluster and/or a series of connected links between the origin cluster and the destination cluster and probabilities for next links given a current link, to update the probabilities for next links during a trip based on a selection of a link by a user of the vehicle, and to, based on statistical properties of the current link and the stored trip data, provide a destination prediction for the vehicle including a prediction of the next link where it is possible to select between two or more alternative next links, wherein to provide the destination prediction the prediction unit is configured to handle missing data and use statistical models for prior information rather than directly use observations, adjust weights for different conditions to improve predictability, and adapt for sequentially increasing data, the prediction unit further configured to provide the destination prediction to a navigation device to provide navigation directions to a user based on the destination prediction, wherein a trajectory of the vehicle is controlled based on the navigation directions and the destination prediction.

2. The system according to claim 1, wherein the trip data comprises information about a number of times a trip between an origin cluster and destination cluster has been performed.

3. The system according to claim 2, wherein a data set of the trip data comprises information about a trip characteristic, wherein the trip characteristic comprises time of day, day of week, time duration of trip, season, number of passengers, fuel level and/or battery level.

4. The system according to claim 1 wherein the stored trip data comprises a probability for a next link and a destination given a current link.

5. The system according to claim 1, wherein the prediction unit is configured to, for an ongoing trip associated with at least one hitherto unobserved trip characteristic, wherein the unobserved trip characteristic comprises time of day, day of week, time duration of trip, season, number of passengers, fuel level and/or battery level, utilize existing data sets of the stored trip data by applying weight factors.

6. The system according to claim 1, wherein the trip data is stored as data sets, wherein a data set of the trip data comprises information of an origin cluster, a destination cluster and/or the series of connected links between the origin cluster and a destination cluster.

7. The system according to claim 1, wherein the trip data includes a data set associated to an individual user.

8. The system according to claim 1, wherein the stored trip data also comprises at least one operation parameter of the vehicle, wherein the at least one operation parameter comprises velocity, orientation, gas pedal opening rate, brake pressure, or steering angle.

9. The system according to claim 1, configured to remove at least one data set of the stored trip data when the data set is irrelevant.

10. A vehicle comprising a system according to claim 1.

11. A method for predicting a destination for a vehicle, the method comprising:
obtaining information of a current location of the vehicle;
associating the current location with a current link in stored trip data comprising information of origin cluster, destination cluster and/or a series of connected links between the origin cluster and the destination cluster and probabilities for next links given a current link;
updating the probabilities for next links during a trip based on a selection of a link by a user of the vehicle;
providing a destination prediction for the vehicle based on statistical properties of the stored trip data and the current link including a prediction of the next link where it is possible to select between two or more alternative next links, wherein providing the destination prediction includes handling missing data and using statistical models for prior information rather than directly using observations, adjusting weights for different conditions to improve predictability, and adapting for sequentially increasing data; and
providing the destination prediction to a navigation device to provide navigation instructions to a user based on the destination prediction; and
controlling a trajectory of the vehicle based on the navigation instructions and the destination prediction.

12. The method according to claim 11, wherein a data set of the trip data also comprises information about a number of times a trip has been performed.

13. The method according to claim 11, wherein a data set of the trip data comprises information about a trip characteristic, wherein the trip characteristic comprises time of day, day of week, time duration of trip, season, number of passengers, fuel level and/or battery level.

14. The method according to claim 11, wherein the stored trip data comprises a probability for a next link and a destination given a current link.

15. The method according to claim 11, wherein, for an ongoing trip associated with at least one hitherto unobserved trip characteristic, wherein the unobserved trip characteristic comprises time of day, day of week, time duration of trip, season, number of passengers, fuel level and/or battery level, existing data sets of the stored trip data are utilized by applying weight factors.

\* \* \* \* \*